United States Patent [19]
Fava et al.

[11] Patent Number: 6,082,703
[45] Date of Patent: Jul. 4, 2000

[54] HYDRAULIC VALVE CONTROLLED BY A PHOTOELECTRIC CELL AND OPERATED BY AN ELECTRIC MOTOR

[75] Inventors: Enzo Fava; Giuseppe Manfredini, both of Recanati, Italy

[73] Assignee: Soema-S.R.L., Italy

[21] Appl. No.: 09/185,815

[22] Filed: Nov. 4, 1998

[51] Int. Cl.$^7$ .............................................. F16K 31/122
[52] U.S. Cl. ................................. 251/30.03; 251/30.02; 251/129.11
[58] Field of Search ........................ 251/30.01, 124.11, 251/30.02, 30.05, 30.03

[56] References Cited

U.S. PATENT DOCUMENTS

| | | | |
|---|---|---|---|
| 1,505,032 | 8/1924 | Klein | 251/30.01 |
| 4,184,703 | 1/1980 | Rubin et al. | 251/118 X |
| 4,195,781 | 4/1980 | Scholz | 239/177 |
| 4,503,887 | 3/1985 | Johnson et al. | 251/30.01 X |
| 4,505,450 | 3/1985 | Saarem et al. | 251/30.01 X |
| 4,517,099 | 5/1985 | Brackner | 210/741 |
| 4,611,356 | 9/1986 | Lin | 251/30.01 X |
| 4,624,441 | 11/1986 | Kreitchman et al. | 251/30.01 |
| 4,699,351 | 10/1987 | Wells | 251/30.01 X |
| 4,995,585 | 2/1991 | Gruber et al. | 251/30.01 X |
| 5,169,117 | 12/1992 | Huang | 251/30.01 X |
| 5,224,684 | 7/1993 | Schouten | 251/30.01 X |
| 5,404,902 | 4/1995 | Wen | 251/30.02 X |
| 5,520,366 | 5/1996 | Elliott | 251/30.01 |

*Primary Examiner*—Kevin Shaver
*Assistant Examiner*—John Bastianelli
*Attorney, Agent, or Firm*—Leonard Bloom

[57] ABSTRACT

The present invention refers to a hydraulic valve controlled by a photoelectric cell and operated by an electric motor, that drags in alternate rotations a revolving disk or revolving obturator, that is an integral part of the "pilot device" and indirectly causes the closing or opening of the duct entry used by the water to exit the valve.

6 Claims, 5 Drawing Sheets

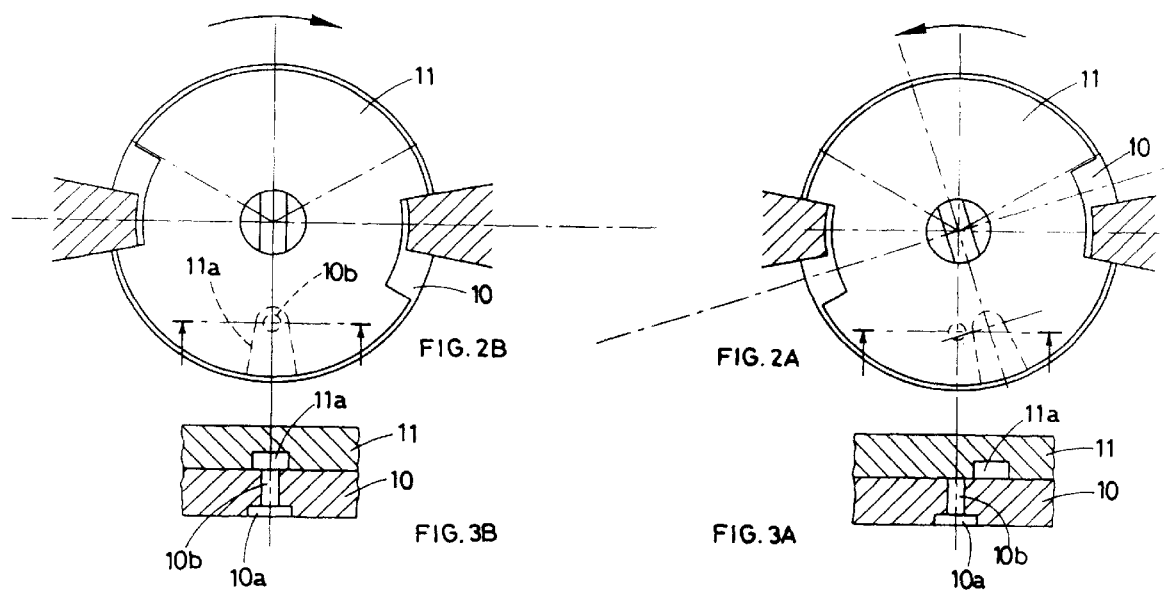
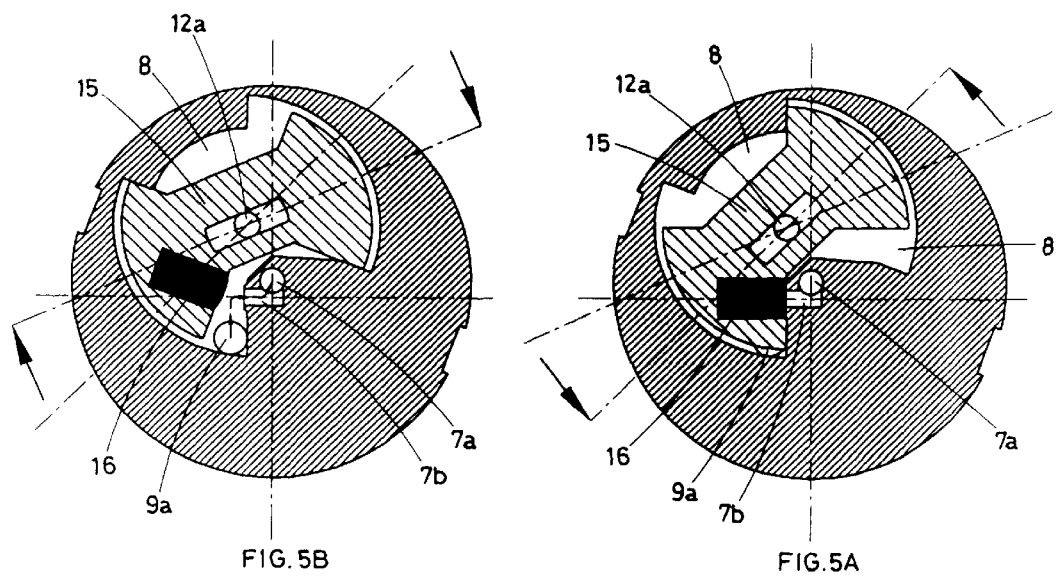

HYDRAULIC VALVE CONTROLLED BY A PHOTOELECTRIC CELL AND OPERATED BY AN ELECTRIC MOTOR

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

The present patent application refers to an hydraulic valve controlled by a photoelectric cell and operated by an electric motor.

The valve according to the present invention has been specifically designed for installation in hydraulic systems in which the delivery of water is controlled by a photoelectric cell that is excited when the user's hands or body approach the fitting used to deliver the water, such as faucets, water closets, public urinals.

The use of these automatically operated hygienic-sanitary fittings is getting more and more popular in the bathrooms of public places, such as bars, restaurants or service areas on highways.

The solenoid valves that are normally used in these hydraulic systems controlled by a photoelectric cell generally consist in an electromagnet that is excited and remains excited as long as the user stays near the hygienic-sanitary fitting, so that the water is delivered in a fully automatic way and only for a limited time interval.

Due to the high power absorption, however, this type of solenoid valves is not suitable for situations in which batteries are used in absence of the supply mains or when no outlet is available next to the hydraulic system concerned.

Under these circumstances, the hydraulic systems use special low-energy consumption solenoid valves that are excited by a photoelectric cell just for the few seconds necessary to open or close them.

These special solenoid valves are basically composed of a bistable electromagnet, whose slug is subject to the opposed action of a return spring and of a permanent magnet, that cause the slug to maintain its stop position, once the excitation of the coil has ended.

In order to reduce the power absorption, these solenoid valves feature very low values of slug stroke and therefore the slug is subject to the attractive action of the permanent magnet even while it is retained by the return spring. Moreover, the dimensions of the return spring must allow for very narrow tolerances in order for the return force to be balanced by the opposed force of the permanent magnet.

It is easily understood how critical this operating system is, since it is based on a highly unstable balance of forces that tend to draw the slug towards two opposite stop directions, in correspondence with the opening and the closing of the valve.

This means that in this type of bistable electromagnets, the opening or closing of the valve can take place for accidental reasons, regardless of the command signal sent by the photoelectric cell, such as water hammering in the water supply, impurities contained in the water, time variation of the opposed forces of the permanent magnet and of the return spring.

Apart from the above-mentioned unreliability, the said bistable electromagnets have the disadvantage of being affected by the water supply pressure, due to the operating principle of the slug, that is the higher the water supply pressure, the higher the necessary force and therefore the power absorbed by the electromagnet to move the slug.

BRIEF SUMMARY OF THE INVENTION

The purpose of the present invention is to obtain an automatically operated hydraulic valve controlled by a photoelectric cell, with a very low power absorption in order to ensure operation for long intervals of time even when operated with batteries.

Another purpose of the present invention is to obtain an automatically operated hydraulic valve controlled by a photoelectric cell, with higher reliability with respect to the above-mentioned bistable electromagnets.

Last but not least, the purpose of the present invention is to obtain a similar hydraulic valve with constant power absorption during the opening and the closing phase, regardless of the water supply pressure.

Based on the traditional constructive principle, the valve according to the present invention is composed of a drilled piston, that slides inside the first waterproof chamber which is directly invaded by the water under pressure coming from the water supply.

The bottom wall of this waterproof chamber is provided with a hole used by the water to exit the valve. The hole is opened or closed by the said piston, that is inserted in a central guide pin on which it freely slides. The guide pin is axially provided with a small duct to create a communicating passage between the exit hole of the water and the second waterproof chamber, adjoining the first chamber. The communication between the second waterproof chamber and the first chamber is provided by a small hole, located on the separation wall between the two chambers.

This means that the water under pressure from the water supply invades the first chamber, then the second chamber and finally reaches the exit hole of the valve by means of the axial duct that goes through the central guide pin of the piston.

The entry of the axial duct, however, is not free, since it is obstructed by an obturator, that is an integral part of the so-called "pilot device" and is controlled by an actuator that is currently represented by the above-mentioned bistable electromagnet.

The valve according to the present invention is characterized by the fact that it makes uses of a completely innovative "pilot device", including a revolving disk or revolving obturator, operated by an electric motor, with the interposition of a step-down gear assembly.

According to the position of the said revolving disk or revolving obturator, the water contained in the second chamber flows into the small axial duct of the guide pin of the sliding piston that ends in the duct used by the water to exit the valve.

In the first constructive version, the said "pilot device" is composed of a pair of opposed disks housed in the second waterproof chamber. One disk is fixed while the other one is rotated by an electric motor with the interposition of a step-down gear assembly.

The fixed disk obstructs the entry of the small axial duct that goes through the guide pin of the sliding piston in the first waterproof chamber. On the side facing the above-mentioned entry, the fixed disk features a radial groove that connects the said entry with a peripheral hole provided on the fixed disk and obstructed by the wall of the revolving disk, opposed to the fixed disk.

On the external edge, the revolving disk features a radial cut used by the water contained in the second waterproof chamber to reach the exit hole of the valve, as long as the above-mentioned revolving disk rotates until its radial cut matches the peripheral hole of the fixed disk.

Due to a pressure mechanism that is hereinafter explained in detail, the matching allows the piston to move back along the central guide pin and free the exit hole it previously obstructed, so that the water flowing in the first waterproof chamber can directly enter the exit hole of the valve.

Vice versa, until the water contained in the second chamber cannot reach the exit hole, the piston of the first chamber remains pressed against the said hole and keeps it closed.

In the second constructive version, the said "pilot device" is composed of a revolving obturator, in the shape of a butterfly, housed in the second chamber and provided with a cap to obstruct the entry of the small axial duct that goes through the guide pin of the piston, so that the water contained in the second chamber can flow through the said duct according to the stop position of the revolving obturator.

For a clearer explication, the description of the present invention continues with reference to the enclosed drawings, only having an explanatory, not restrictive purpose, in which:

BRIEF DESCRIPTION OF THE DRAWINGS

FIGS. 2A and 2B are two plan views of the pair of opposed disks, shown in the closing and opening position of the valve, respectively;

FIGS. 3A and 3B are the cutaway views of FIGS. 2A and 2B, respectively, with the cutting planes indicated in FIGS. 2A and 2B;

FIGS. 5A and 5B are two cutaway views of the above-mentioned revolving obturator with a perpendicular plane to its axis of oscillation; these views show the obturator in the closing and opening position of the valve, respectively.

DETAILED DESCRIPTION OF THE INVENTION

Figure 1A:
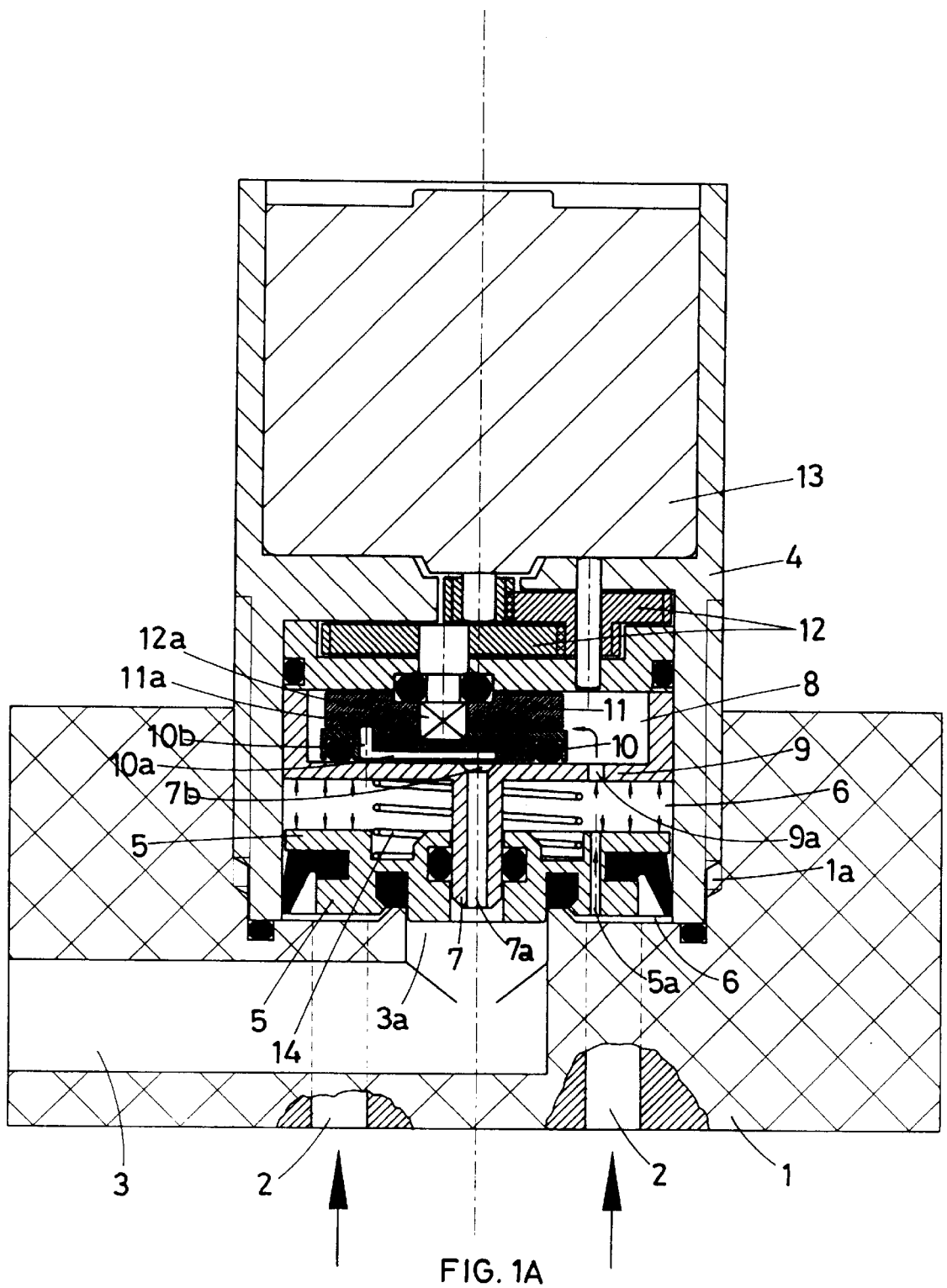
FIGS. 1A and 1B are two cutaway views of the valve according to the present invention (in the first constructive version) with a diametral plane passing through the axis of the above-mentioned piston; these figures show the valve in its closing and opening position, respectively.
Figure 1B:
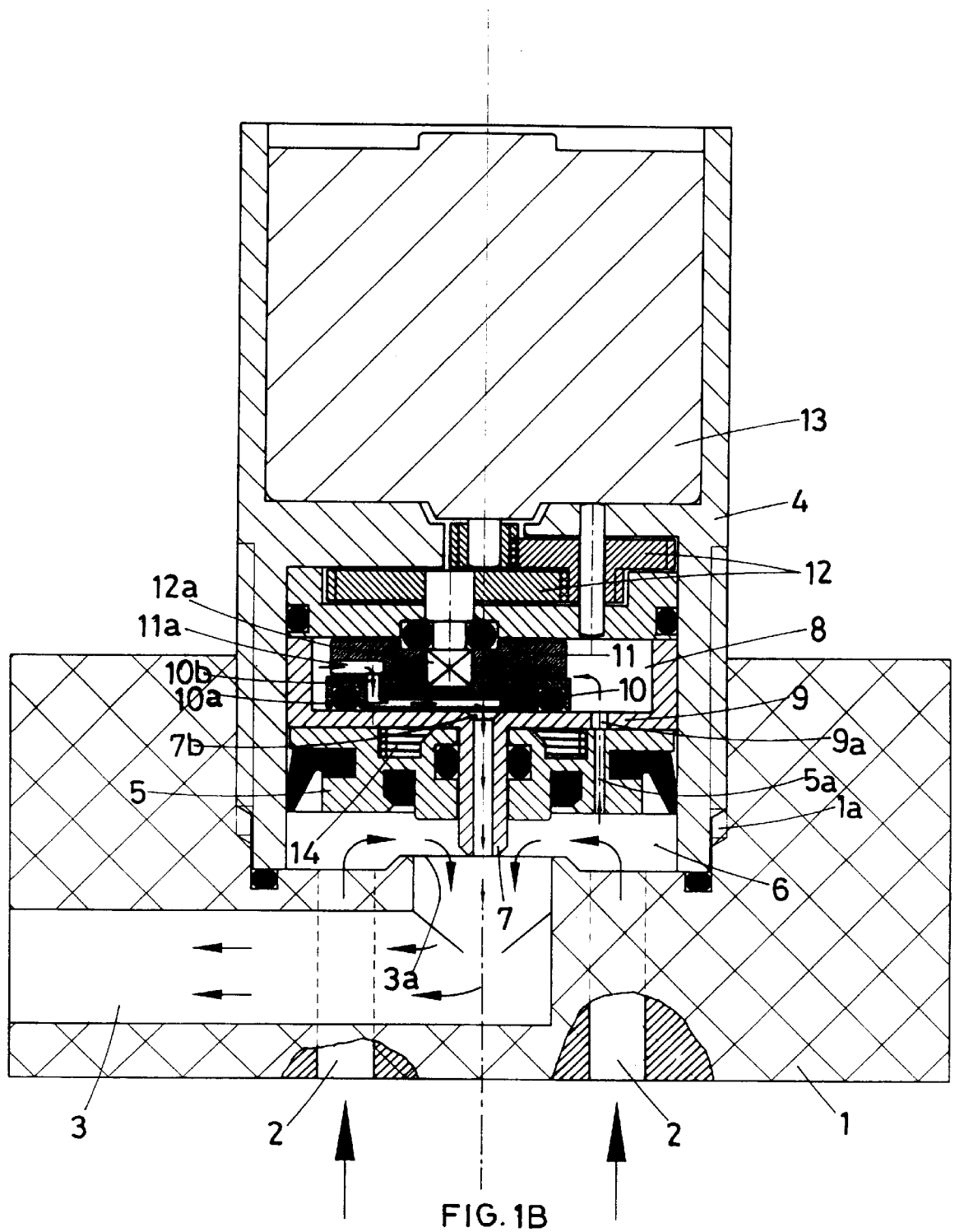

With reference to FIGS. 1A and 1B, in the first constructive version, the valve according to the present invention is composed of a valve-body (1) with a circular housing (1a) where the entry ducts (2) of the water from the water supply peripherally end.

The center of the bottom wall of the said housing (1a) is provided with the entry hole (3a) of the exit duct (3) of the water.

The cylindrical glass (4) that contains both the piston (5) used to obstruct the hole (3a) and the so-called "pilot device" is screwed onto the circular housing (1a).

The piston (5) is contained in the first chamber (6) whose bottom wall is the same as the bottom wall of the circular housing (1a), that is centrally provided with the entry hole (3a) of the exit duct (3) of the water.

The said piston (5) is inserted in a central guide pin (7) on which it freely slides. The guide pin is axially provided with a small duct (7a) that creates a communicating passage between the exit duct of the water (3) and the second chamber (8), adjoining the first chamber (6), and separated from it by an intermediate wall (9) provided with a small hole (9a) that creates a communicating passage between the two adjoining chambers (6 and 8).

The so-called "pilot device" is composed of a pair of opposed disks (10 and 11) housed in the second chamber (8). The first disk (10) is fixed while the second one (11) revolves and is splined to the shaft (12a) of a step-down gear assembly (12), operated by an electric motor (13) contained in a suitable housing provided in the above-mentioned cylindrical glass (4).

The fixed disk (10) is located against the separation wall (9) in order to obstruct the entry of the small duct (7a), but not the hole (9a) that creates a communicating passage between the chambers (6 and 8).

On the side facing the wall (9), the fixed disk (10) features a radial groove (10a) that creates a communicating passage between the entry (7b) of the small duct (7a) and a peripheral hole (10b) drilled on the edge of the disk (10).

Along its edge, the revolving disk (11) features a radial cut (11a) used by the water contained in the second chamber (8) to flow into the groove (10a) of the first disk and then into the duct (7a), as long as the position of the revolving disk (11) allows the cut (11a) to match the hole (10b) of the fixed disk (10).

This patent application continues with the description of the valve operation according to the present invention, starting from the closing position of the valve, as shown in FIG. 1A.

In this condition, the piston (5) obstructs the entry hole (3a) of the exit duct (3), being pushed against the bottom wall of the first chamber (6) by the pressure of the delivered water that, coming from the entry ducts (2), fills the first chamber (6) and invades the second chamber (8), passing through the hole (9).

The piston (5) is provided with a through hole (5a) used by the water to reach the space behind the piston (5), regardless of the watertight seal created by ordinary gaskets between the piston (5), the chamber walls (6), and the central guide pin (7).

Until the cut (11a) of the revolving disk (11) does not match the hole (10b) of the fixed disk (10), the water from the water supply stagnates in the first chamber (6) and in the second chamber (8), where the hydrostatic pressure is the same as the water supply pressure.

Thanks to the proper differentiation between the surfaces of the two opposed sides of the piston (5), the piston is subject to an hydraulic thrust that pushes it against the bottom wall of the chamber (6), thus obstructing the entry hole (3a) of the exit duct (3) of the valve.

The hydraulic thrust is complemented by the thrust of a spring (14), inserted on the pin (7) and interposed between the separation wall (9) and the piston (5).

When the photoelectric cell enables the operation of the motor (13), the motor drags the revolving disk (11) for a short angle, in order to match the cut (11a) with the hole (10b) of the fixed disk (10).

In the matching position, the hydrostatic pressure of the second chamber (8) suddenly drops, since the stagnating water flows through the duct (7a) and then enters the exit duct (3).

The pressure drop in the second chamber (8) is immediately followed by an identical drop in the first chamber (6), thus moving the piston (5) backward. Since the pressure on the back of the piston cannot oppose the pressure on the front, the exit duct (3) of the water opens.

Figure 4A:
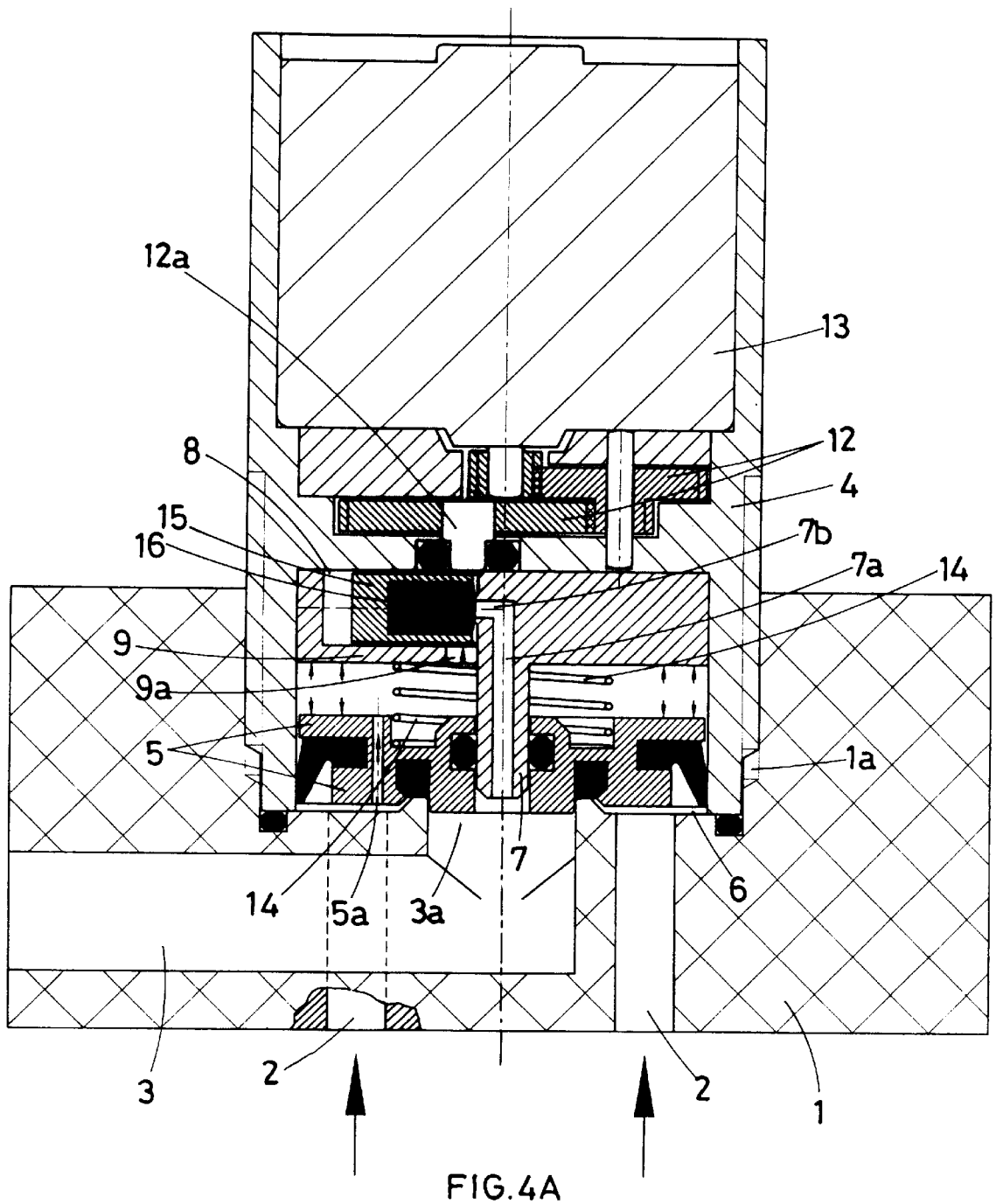
FIGS. 4A and 4B are two cutaway views of the valve according to the present invention (in the second constructive version) with a diametral plane passing through the axis of the above-mentioned piston; these figures show the valve in its closing and opening position, respectively.
Figure 4B:
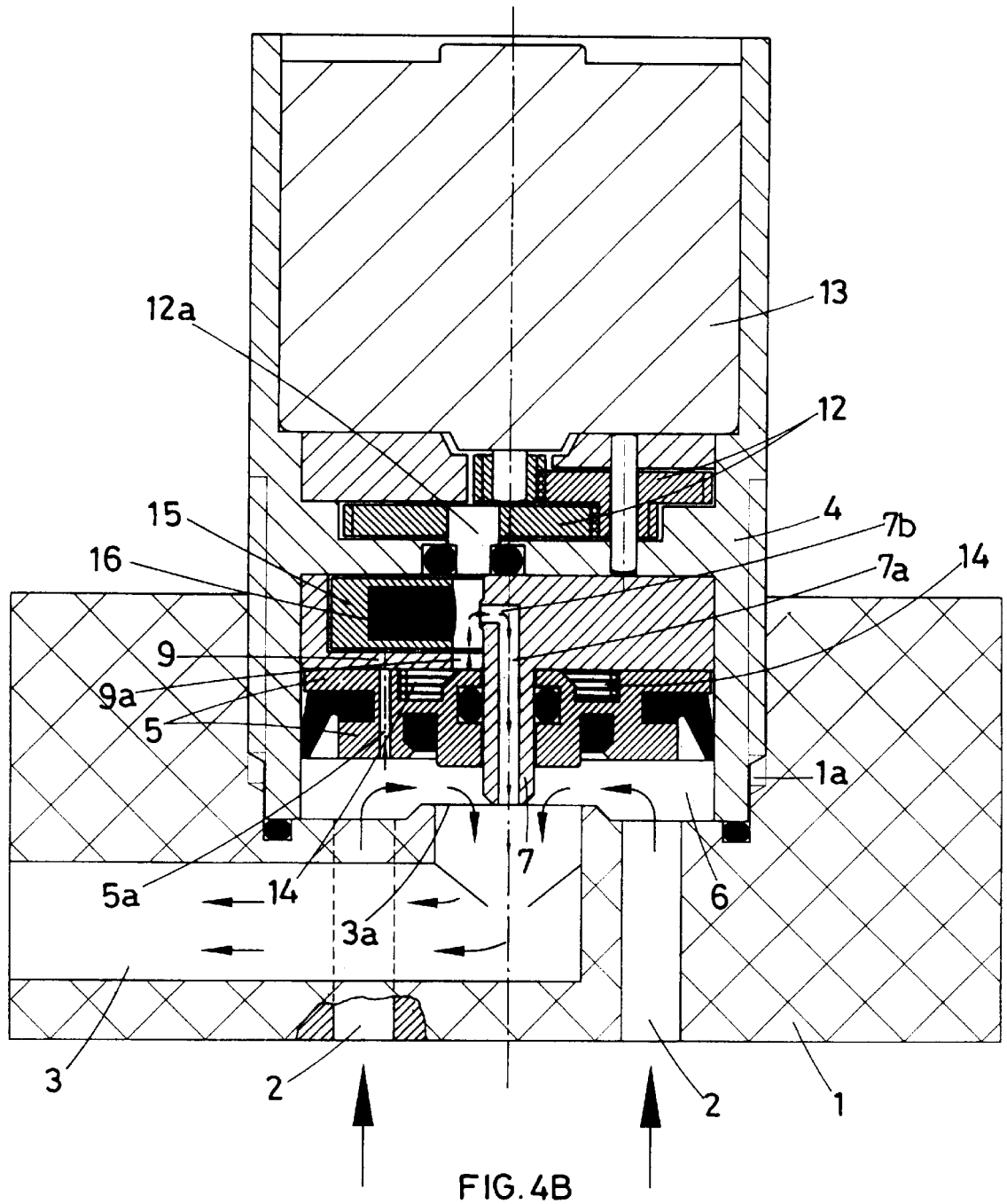

With reference to FIGS. 4A and 4B, as well as to FIGS. 5A and 5B, in the second constructive version of the present invention the "pilot device" includes an obturator (15) in the shape of a butterfly, that is dragged in reverse rotations by the shaft (12a) of the step-down gear assembly (12). The obturator (15) is housed in the second chamber (8) that communicates with the first chamber (6) through a hole (9a) drilled on the separation wall (9).

The obturator (15) is provided with a rubber cap (16) used to obstruct the entry hole (7b) of the small duct (7a) that goes through the guide pin (7) of the piston (5).

It is understood that the operation of the valve is the same as described above, with the only difference that in the first constructive version the opening or closing of the valve is enabled by the oscillation of the revolving disk (11), while in the second constructive version the opening or closing of the valve depends on the position of the oscillating obturator (15).

What is claimed is:

1. A hydraulic valve connected to, and controlled by, a photoelectric cell connected to an electric motor (13), the valve comprising:

a body (1), an entry duct (2) formed in the body wherein pressurized water enters the valve, a first chamber (6) and a second chamber (8) disposed in the body, a separation wall between the first chamber and the second chamber, a hole (9a) being formed in the separation wall wherein the first chamber and the second chamber are in communication, an exit duct (3) formed in the body and communicating with the first chamber, a piston (5) disposed in the first chamber and received in the exit duct, the piston being slidably mounted on a hollow pin (7) having an axis, a duct (7a) formed in the hollow pin, the duct communicating with the exit duct and the second chamber, a pilot device disposed in the second chamber, the pilot device having an oscillating member (15), the oscillating member moving through an angle in a plane transverse to the axis of the hollow pin and opening and closing the duct formed in the hollow pin such that the pilot device controls the flow of water through the duct in the hollow pin, affecting hydrostatic pressure at the exit duct such that the piston is moved to obstruct the exit duct.

2. A hydraulic valve connected to, and controlled by, a photoelectric cell and connected to an electric motor (13), the valve comprising:

a body (1), an entry duct (2) formed in the body wherein pressurized water enters the valve, a first chamber (6) and a second chamber (8) disposed in the body, a separation wall (9) between the first chamber and the second chamber, a hole (9a) being formed in the separation wall wherein the first chamber and the second chamber are in communication, an exit duct (3) formed in the body and communicating with the first chamber, a piston (5) disposed in the first chamber and received in the exit duct, the piston being slidably mounted on a hollow pin (7) having an axis, a duct (7a) formed in the hollow pin, the duct communicating with the exit duct and the second chamber, an obturator disposed in the second chamber and connected to the electric motor controlled by the photoelectric cell, wherein the obturator may oscillate in reverse rotation through an angle in a plane transverse to the axis of the hollow pin when the motor is activated, a rubber cap (16) attached to the obturator, the rubber cap obstructing the duct in the hollow pin when the obturator oscillates, wherein water enters the first and second chambers developing a hydrostatic pressure therein and the oscillation of the obturator controls movement of water from the second chamber through the duct in the hollow pin in the piston, affecting the hydrostatic pressure at the exit duct such that when the hydrostatic pressure is unbalanced on the piston, the piston is moved to obstruct the exit duct.

3. The hydraulic valve of claim 1, wherein the oscillating member is in the shape of a butterfly.

4. The hydraulic valve of claim 1, wherein the oscillating member is connected through a gear assembly (12) to the electric motor.

5. The hydraulic valve of claim 2, wherein the obturator is in the shape of a butterfly.

6. The hydraulic valve of claim 2, wherein the oscillating member is connected through a gear assembly (12) to the electric motor.

* * * * *